April 27, 1954 R. A. FRYE ET AL 2,676,492
VARIABLE SPEED DRIVE MECHANISM
Filed Jan. 6, 1951 3 Sheets-Sheet 1

INVENTORS
Reinhold A. Frye and
Michael Bracutt

BY Moser, Nolte, Crews & Berry
ATTORNEYS

INVENTORS
Reinhold A. Frye and
Michael Bracutt

BY Moses, Nolte, Crews & Berry
ATTORNEYS

April 27, 1954  R. A. FRYE ET AL  2,676,492
VARIABLE SPEED DRIVE MECHANISM
Filed Jan. 6, 1951  3 Sheets-Sheet 3

INVENTORS
Reinhold A. Frye and
Michael Bracutt

BY Moser, Nolte, Crews + Berry
ATTORNEYS

Patented Apr. 27, 1954

2,676,492

UNITED STATES PATENT OFFICE 2,676,492

VARIABLE SPEED DRIVE MECHANISM

Reinhold A. Frye, River Edge, and Michael Bracutt, East Orange, N. J., assignors, by mesne assignments, to Reconstruction Finance Corporation, New York, N. Y., a corporation of the United States Application January 6, 1951, Serial No. 204,734

11 Claims. (Cl. 74—192)

This invention relates to variable speed drive mechanism, and more particularly to variable speed drive mechanism of the type in which drive is transmitted from one shaft to another by confronting cones through the medium of interposed shiftable traction rings.

Cone and ring drives are known in which two cones arranged back to back on one shaft are flanked by cones on a second shaft to provide two confronting pairs, together with means for concurrently and coordinately shifting the rings to change the speed ratio. This doubles the power transmitting capacity which could be had from a single pair of confronting cones but still provides an amount of power which is inadequate for many useful purposes, notably for the driving of gun turrets.

It is a primary object of the present invention to further multiply the transmission paths in a drive mechanism of small size and weight and to provide a simple and effective control for changing the drive ratios of all the paths concurrently and coordinately.

To this end a central shaft is provided with a pair of cones and several parallel outer shafts, desirably three, are provided, at equiangular intervals about, and at equal distances from the axis of, the central shaft, each outer shaft being provided with a pair of cones which are disposed in confronting overlapping relation to the cones on the central shaft. The outer shafts are all connected to a common input or output member depending upon the direction of drive.

If, as suggested, three outer shafts are provided, each of the two cones on the central shaft will cooperate with a cone on each of the three outer shafts so that six parallel transmission channels will be made simultaneously active and six rings will be employed, each ring surrounding one of the outer shafts. It is important that the several rings be adjusted simultaneously and in unison with one another so that there will be no substantial disparity of drive ratios.

It is accordingly an important feature of the invention that common control means is provided for the several rings and that identically operating connections are run from the control means to the respective rings for adjusting the drive ratios.

It is a particular feature of the invention that a common control is provided capable of controlling the rings concurrently and coordinately, even though the rings be all disposed in different planes.

In the drawing forming part of this specification:

Figure 1:
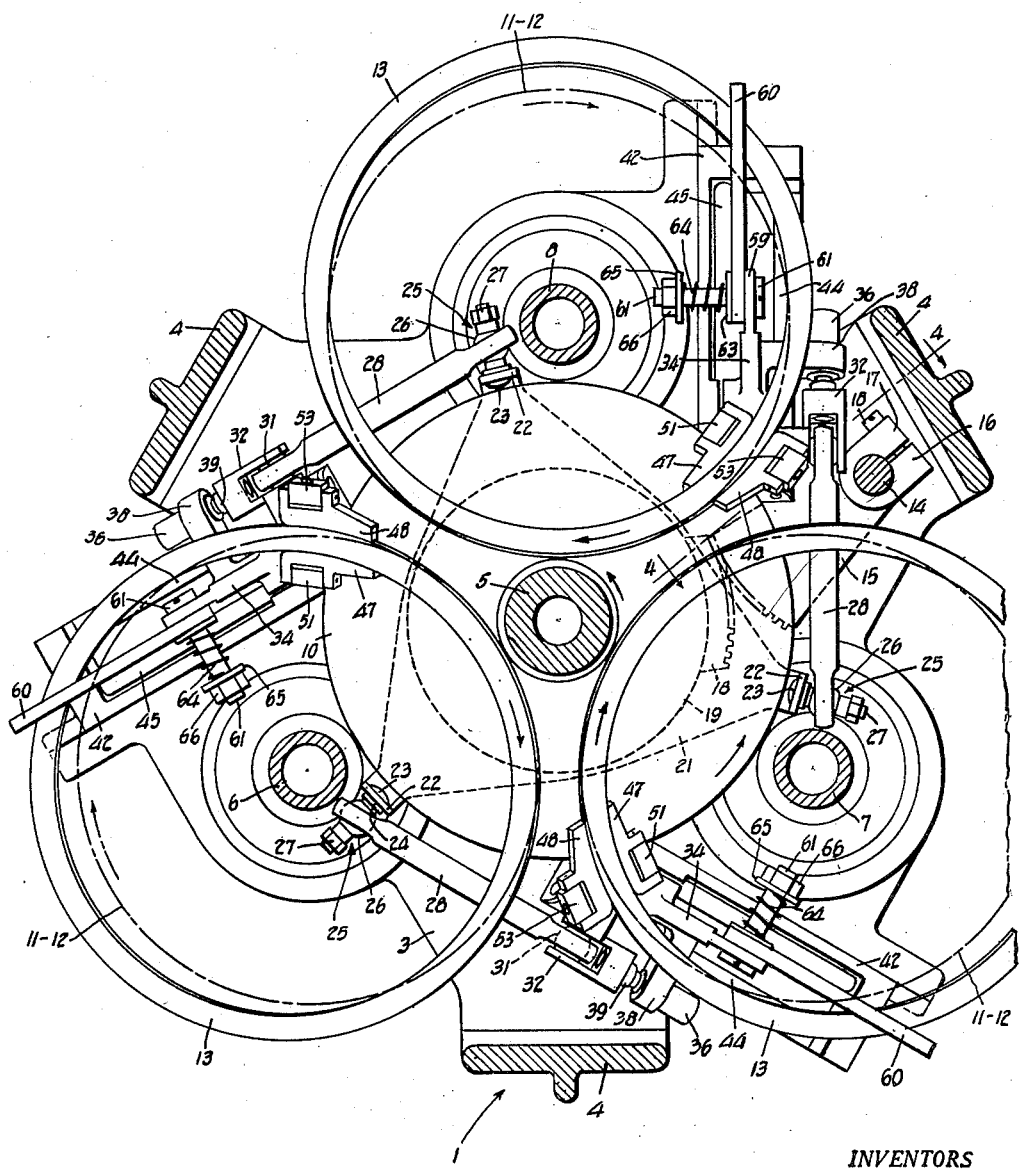
Figure 1 is a transverse sectional view showing a six ring transmission mechanism illustrative of the present invention.
Figure 2:
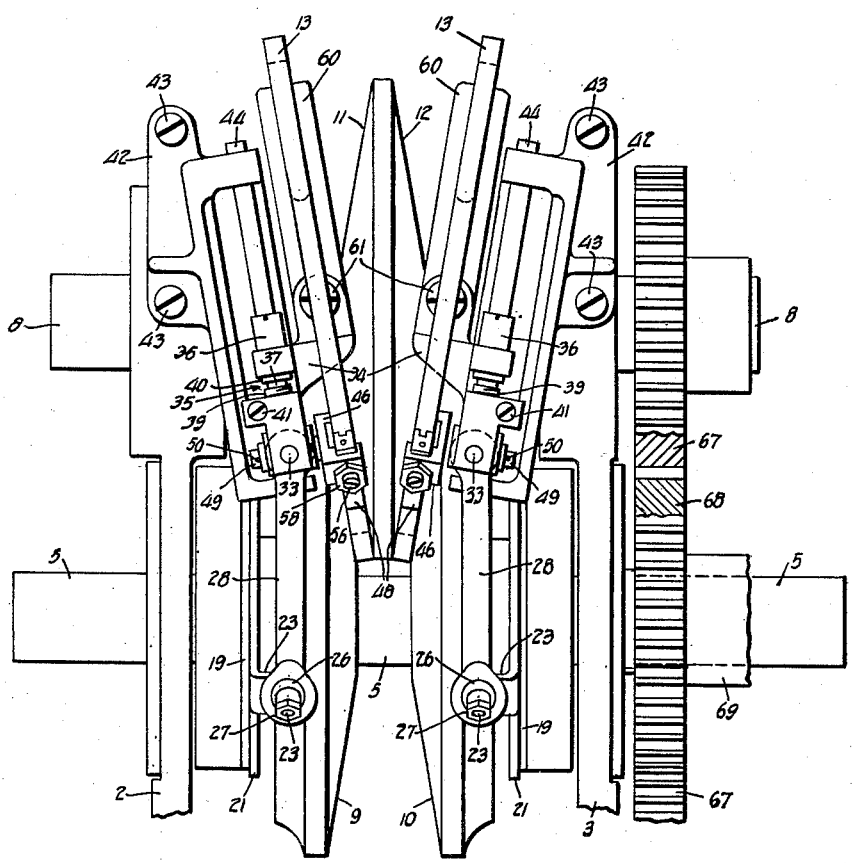
Figure 2 is a fragmentary view in side elevation illustrating the central shaft, one of the outer shafts, and the cones, rings, and control mechanism associated with said shafts.
Figure 3:
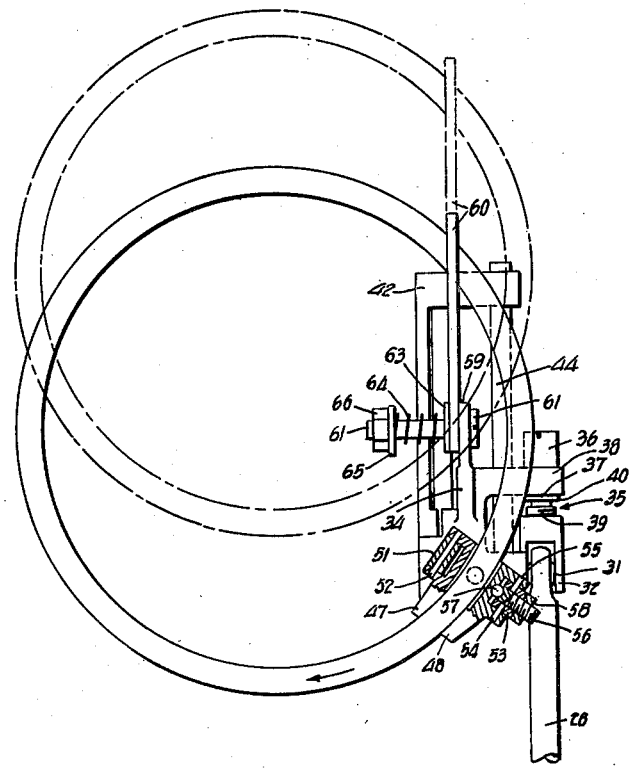
Figure 3 is a detail view showing one of the rings and the guide mechanism associated therewith, the rings and guide mechanism being shown in one position in full lines and in another position in broken lines.
Figure 4:
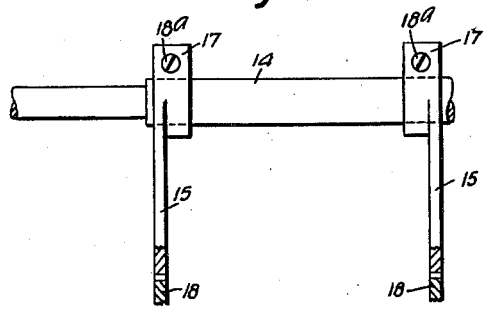
Figure 4 is a view in section taken on the line 4—4 of Figure 1 showing some of the controlling mechanism for the traction rings.

The transmission mechanism comprises a spider-like frame 1 which comprises end members 2 and 3 and connecting webs 4. The end members 2 and 3 provide bearing for a central shaft 5 and for three outer shafts 6, 7 and 8.

Between the end members the shaft 5 has fast upon it a pair of traction cones 9 and 10 which are spaced apart and face one another, the cones being secured against movement longitudinally of the shaft 5 in any suitable manner. Upon each of the shafts 6, 7 and 8, two cones 11 and 12 which desirably form an integral structure are secured in back to back relation. Each of the cones 11 overlaps and confronts a portion of the cone 9 while each of the cones 12 overlaps and confronts a portion of the cone 10. Traction rings 13 are interposed between each confronting pair of cones. Since three outer cones confront the cone 9 and three outer cones confront the cone 10, six rings altogether are employed in the illustrative mechanism.

The cones are all of equal slope and have straight generatrices so that parallel elements of the overlapping pairs confront one another at all times and bear against opposite sides of the interposed rings 13. The rings have flat parallel side faces which are disposed in planes at right angles to the ring axes. Each ring, therefore, extends at the slope of the cone with which it is engaged. Each ring extends around the outer shaft with which it is associated and is adapted to be shifted toward and from the axis of the central shaft to change the drive ratio, by a tilting of the ring in one direction or another in its own plane.

As pointed out in pending application, Serial No. 240,302, filed by the executors of the estate of Peter J. McLaren, on August 4, 1951, for Speed Change Transmission, upon which the present application is an improvement, when a given drive ratio has been selected and is being maintained uniform, the center of a ring stands in the common plane of the axes of the two cone shafts with which it is associated. When it is tilted in one direction in its own plane, a feed component is developed tending to shift the ring radially of the shafts in one direction and to restore the ring center to the common axial plane, and when the ring is tilted in its own plane in the opposite direction, a feed component is developed tending to feed the ring radially in the opposite direction and to restore the ring center to the common axial plane.

In the present mechanism the rings are controlled according to this principle, there being a common control shaft 14 which is connected to control all of the rings concurrently and coordinately. The shaft 14 has fast upon it a pair of sectors 15, each sector being split to provide ears 16 and 17. In each instance a screw 18a is passed through the ear 17 and threaded into the ear 16, being tightened to clamp the sector firmly in place upon the shaft. Each sector 15 meshes with a segment 18 provided on a disc 19. Each disc 19 is rockably mounted upon the shaft 5 and has affixed to it in any suitable manner an equilateral triangular actuator plate 21.

Each plate 21 is provided at each of its vertices with an arm 22 which is bent to extend substantially parallel to the axis of the shaft 5. The arms 22 are connected by identical linkage mechanisms 28, 32 for controlling the respective rings 13. Since these linkages and their accessory parts are identical, a single description will suffice for all.

A screw 23 is passed through arm 22 and through a washer 24. A sleeve 25 having a spherical enlargement 26 is mounted upon the screw and the assembly is clamped together by a nut 27 which is threaded upon the outer end of the screw. A link 28 is formed with a spherical seat to fit upon the spherical enlargement 26 for effecting a universal connection of the link 28 with the arm 22.

The opposite end of the link 28 is formed with a similar spherical seat for fitting upon a ball 31 which is secured in a fork 32 by a pin 33. The fork 32 is carried by a slide 34. A flat face of the fork 32 is engaged by the slide 34 so that the fork can not rotate. The fork 32 is supported upon a screw 35 which is carried by the slide and which is threadable into a split rear end of the fork. The screw comprises a slotted head 36, a body portion 37 which is passed through an ear 38 of the slide 34, and a forward end portion 39 which is threaded and which is screwed into the fork 32 to adjust the fork toward and from the ear. A collar 40 secured upon the body portion 37 prevents longitudinal movement of the screw relative to the ear 38 while permitting rotation of the screw. Rotation of the screw is effective therefore to adjust the length of the linkages 28, 32 and hence to adjust the ear 38 and the slide toward and from the arm 22. When a desired adjustment has been secured, a screw 41 which is passed through one ear at the split end of the fork and threaded into a spaced opposing ear is turned to clamp the split end of the fork upon the threaded portion 39 of the screw 35 so as to prevent accidental disarrangement.

The slide 34 is mounted for sliding movement parallel to the plane of the associated ring upon a guide bracket 42. The guide bracket 42 is secured by screws 43 to the frame 1. The bracket carries a guide rod 44 which extends parallel to the plane of the associated ring and which passes through the slide 34. The guide bracket carries a second guide rod 45, also parallel to the plane of the associated ring, which is partially embraced by the slide 34. The slide 34 pivotally supports a block 46 by which ring guides 47 and 48 are carried. The block 46 includes a stem portion 49 which is passed through the slide 34 and is retained in place by a suitable pin such as a cotter pin 50.

The head of the block 46 is C-shaped. In one of its arms 51 the guide 47 for engaging the inner face of the ring is pivotally carried upon a pivot pin 52. Upon the other arm 53 of the block 46 the guide 48 for engaging the outer face of the ring is pivotally carried by pins 54 and 55. A screw 56 is threaded through the arm 53 between the pins 54 and 55 and into engagement with a ball 57 which bears against an outer face of the guide 48. The pressure exerted upon the ball tends to urge the guides 47 and 48 toward one another and toward the ring so as to provide a snug but not a binding fit. The screw 56 is fixed in adjusted position by means of a lock nut 58.

The slide 34 includes an offset arm 59 upon which a ring dampener 60 is carried. The dampener 60 consists of a forked flat arm which embraces the associated ring. The closed end of the arm 60 is pivotally supported upon a screw 61 which passes through the offset arm 59 of the slide 34. The screw, after being passed through the arms 59 and 60, is passed through a washer 63, a compression coil spring 64, a washer 65, and a nut 66. Tightening of the nut 66 compresses the spring 64 and increases the frictional pressure with which the arms 59 and 60 are held against one another. The arm 60 is accordingly free to assume a ring embracing position indicated by the ring but nevertheless opposes frictionally any wabbling vibration of the ring.

In normal operation it may be assumed that a certain drive ratio has been selected and that the control shaft 14 has been held in a fixed position long enough to cause that ratio to become established. In these circumstances the center of each ring will lie in the common axial plane of shaft 5 and of the outer shaft which is surrounded by the ring. The radial position of each ring will be a position characteristic of the position of the control shaft 14. Each ring will occupy the same radial relation with respect to the shaft 5.

If now the shaft 14 is turned, all the rings will be tilted in their own planes substantially about the area of contact with the associated cones so that the center of each ring will be shifted away from the common axial plane of the shaft 5 and the outer shaft surrounded by the ring. This causes a radial feed component to be applied to the ring, causing the ring to be fed toward or from the shaft 5 according to the direction of the tilting. Such feeding will also tend to return the center of the ring to the common axial plane of the shaft 5 and the outer shaft surrounded by the ring. When the center of the ring has been so returned the radial feed component is neutralized and a new drive ratio becomes established consistent with the new position of the shaft 14.

Operation of a slide 34 outward away from the shaft 5 induces the associated ring to be fed outward by the cones. As the ring is fed outward, therefore, the dampener fork 60 is moved outward, being always in a position to embrace and cooperate with the associated ring.

The shaft 5 may be utilized either as the input or the output shaft. The outer shafts 6, 7 and 8 may be inter-geared with one another in any suitable manner as by providing each of the outer shafts with a gear 67, the several gears 67 being all in mesh with a common central gear 68 fast upon a hollow shaft 69. As illustrated, the shaft 69 is rotatably mounted upon the shaft 5.

We have described what we believe to be the best embodiments of our invention. We do not wish, however, to be confined to the embodiments shown, but what we desire to cover by Letters Patent is set forth in the appended claims.

We claim:

1. An infinitely variable speed change transmission comprising a central shaft and a plurality of outer shafts disposed equidistantly from the central shaft, a traction cone on the central shaft, a traction cone on each of the outer shafts, each of the latter cones being disposed in confronting overlapping relation to the former, traction drive rings disposed between the faces of confronting cone pairs and each having its lateral faces engaged with the faces of the associated cones, and mechanism constructed and arranged to control the shifting and the positioning of the rings concurrently and coordinately to assure correspondence of speed ratios between the central shaft and the several outer shafts at all times including means for tilting the several rings simultaneously and equally in their own planes.

2. An infinitely variable speed change transmission comprising a central shaft and a plurality of outer shafts disposed equidistantly from the central shaft, a traction cone on the central shaft, a traction cone on each of the outer shafts, each of the latter cones being disposed in confronting overlapping relation to the former, traction drive rings disposed between the faces of confronting cone pairs and each having its lateral faces ingaged with the faces of the associated cones, mechanism constructed and arranged to control the shifting and the positioning of the rings concurrently and coordinately to assure correspondence of speed ratio between the central shaft and the several outer shafts at all times, including means for tilting the several rings simultaneously and equally in their own planes and means intergearing the outer shafts with one another.

3. An infinitely variable speed change transmission comprising a central shaft and a plurality of outer shafts disposed equidistantly from the central shaft, a traction cone on the central shaft, a traction cone on each of the outer shafts, each of the latter cones being disposed in confronting overlapping relation to the former, traction drive rings disposed between the faces of confronting cone pairs and each having its lateral faces engaged with the faces of the associated cones, and mechanism constructed and arranged to control the rings concurrently and coordinately comprising a common actuator mounted for rotation about the axis of the central shaft, a manual operating member therefor, ring tilting guides engageable with the respective rings to tilt them in their own planes, slides upon which said guides are rockably carried, supporting guides for the respective slides each extending parallel to the plane of the associated ring, and similar linkages connecting the common actuator with the respective slides.

4. A structure as set forth in claim 3 in which the linkages referred to include widely separated universal connections at their opposite ends together with means for adjusting their effective lengths.

5. An infinitely variable speed change transmission comprising a central shaft and a plurality of outer shafts disposed equidistantly from the central shaft, a traction cone on the central shaft, a traction cone on each of the outer shafts, each of the latter cones being disposed in confronting overlapping relation to the former, traction drive rings disposed between the faces of confronting cone pairs, mechanism constructed and arranged to control the rings concurrently and coordinately comprising a common actuator mounted for rotation about the axis of the central shaft, a manual operating member therefor, ring tilting guides engageable with the respective rings to tilt them in their own planes, slides upon which said guides are rockably carried, supporting guides for the respective slides each extending parallel to the plane of the associated ring, similar linkages connecting the common actuator with the respective slides, and forked ring dampeners carried by the respective slides and embracing the associated rings for opposing lateral vibration of the rings.

6. An infinitely variable speed change transmission comprising a central shaft and a plurality of outer shafts disposed equidistantly from the central shaft, a traction cone on the central shaft, a traction cone on each of the outer shafts, each of the latter cones being disposed in confronting overlapping relation to the former, traction drive rings disposed between the faces of confronting cone pairs, and mechanism constructed and arranged to control the rings concurrently and coordinately comprising a common actuator mounted for rotation about the axis of the central shaft, a manual operating member therefor, ring tilting guides engageable with the respective rings to tilt them in their own planes, slides upon which said guides are rockably carried, supporting guides for the respective slides each extending parallel to the plane of the associated ring, and similar linkages connecting the common actuator with the respective slides, forked ring dampeners carried by the respective slides and embracing the associated rings for opposing lateral vibration of the rings, each forked ring dampener being pivotally supported to permit it to assume a position dictated by the ring itself, and means for frictionally resisting pivotal movement of the dampener for causing the dampener to oppose vibration of the ring.

7. An infinitely variable speed change transmission mechanism comprising a central shaft and a plurality of outer shafts disposed equidistantly from the central shaft, a pair of spaced-apart traction cones made fast upon the central shaft and disposed to face one another, a pair of traction cones disposed back to back on each of the outer shafts, each of the latter cones being disposed in confronting overlapping relation to one of the cones on the central shaft, traction drive rings disposed between the faces of each of the confronting cone pairs and each having its lateral faces engaged with the faces of the associated cones, and mechanism constructed and arranged to control the shifting and the positioning of the rings concurrently and coordinately to assure correspondence of speed ratio between the cones on the central shaft and the cones on all of the outer shafts, comprising actuators flanking the cones on the central shaft and mounted for rocking movement about the axis of said shaft, a common manual operating member therefor, ring tilting guides engageable with the respective rings for tilting the rings in their own planes, slides upon which the guides are rockably carried, supporting guides for the respective slides, each extending parallel to the plane of the associated ring, and similar linkages connecting the actuators with the respective slides controlled by them.

8. An infinitely variable speed change transmission mechanism comprising a central shaft and a plurality of outer shafts disposed equidistantly from the central shaft, a pair of spaced-apart traction cones made fast upon the central shaft and disposed to face one another, a pair of traction cones disposed back to back on each of the outer shafts, each of the latter cones being disposed in confronting overlapping relation to one of the cones on the central shaft, traction drive rings disposed between the faces of each of the confronting cone pairs and each having its lateral faces engaged with the faces of the associated cones, and mechanism constructed and arranged to control the shifting and the positioning of the rings concurrently and coordinately to assure correspondence of speed ratio between the cones on the central shaft and the cones on all of the outer shafts, comprising actuators flanking the cones on the central shaft and mounted for rocking movement about the axis of said shaft, a common manual operating member therefor, ring tilting guides engageable with the respective rings for tilting the rings in their own planes, slides upon which the guides are rockably carried, supporting guides for the respective slides, each extending parallel to the plane of the associated ring, and similar linkages connecting the actuators with the respective slides controlled by them, the rings being arranged to extend divergently at the slope of the cone elements with which they are engaged and each being disposed to surround the outer shaft with which it is associated.

9. An infinitely variable speed change transmission mechanism comprising a central shaft and three outer shafts disposed equidistantly from the central shaft and at equiangular intervals about the central shaft, a traction cone on the central shaft, a traction cone on each of the outer shafts, each of the latter cones being disposed in confronting overlapping relation to the former, traction drive rings disposed between the faces of confronting cone pairs and each having its lateral faces engaged with the faces of the associated cones, each ring extending around one of the outer shafts, and mechanism constructed and arranged to control the shifting and the positioning of the rings concurrently and coordinately to assure correspondence of speed ratio between the central shaft and the several outer shafts at all times, said control mechanism including a member disposed around the central shaft and rockable about the axis thereof, guides engageable with the respective rings for tilting them in their own planes or for holding them steadily in set positions, and identical operating connections from said rockable member to the several guides.

10. In a variable speed mechanism having parallel shafts, traction cones fast on the respective shafts and confronting one another, and a traction ring interposed between the confronting faces of the cones and in engagement with both of them, the combination with the ring of novel control mechanism therefor comprising a slide, a supporting guide for the slide disposed in parallelism with the plane of the ring, ring guiding members carried by the slide and engageable with the inner and outer faces of the ring for tilting the ring in its own plane to induce a change of driving ratio between the shafts, a forked ring dampener embracing the ring and mounted upon the slide with capacity for pivotal movement transversely of the ring plane, and frictional means opposing such pivotal movement of the dampener.

11. In a variable speed mechanism having parallel shafts, traction cones fast on the respective shafts and confronting one another, and a traction ring interposed between the confronting faces of the cones and in engagement with both of them, the combination with the ring of novel control mechanism therefor comprising a slide, a supporting guide for the slide disposed in parallelism with the plane of the ring, ring guiding members carried by the slide and engageable with the inner and outer faces of the ring for tilting the ring in its own plane to induce a change of driving ratio between the shafts, and a ring dampener carried by the slide and engageable with the opposite sides of the ring for suppressing wabbling oscillation of the ring.

References Cited in the file of this patent

UNITED STATES PATENTS

| Number | Name | Date |
| --- | --- | --- |
| 1,362,655 | West | Dec. 21, 1920 |
| 1,709,346 | Garrard | Apr. 16, 1929 |
| 2,089,295 | Pollard | Aug. 10, 1937 |
| 2,233,967 | Wellton | Mar. 4, 1941 |
| 2,593,510 | Wildhaber | Apr. 22, 1952 |